Figure 1:
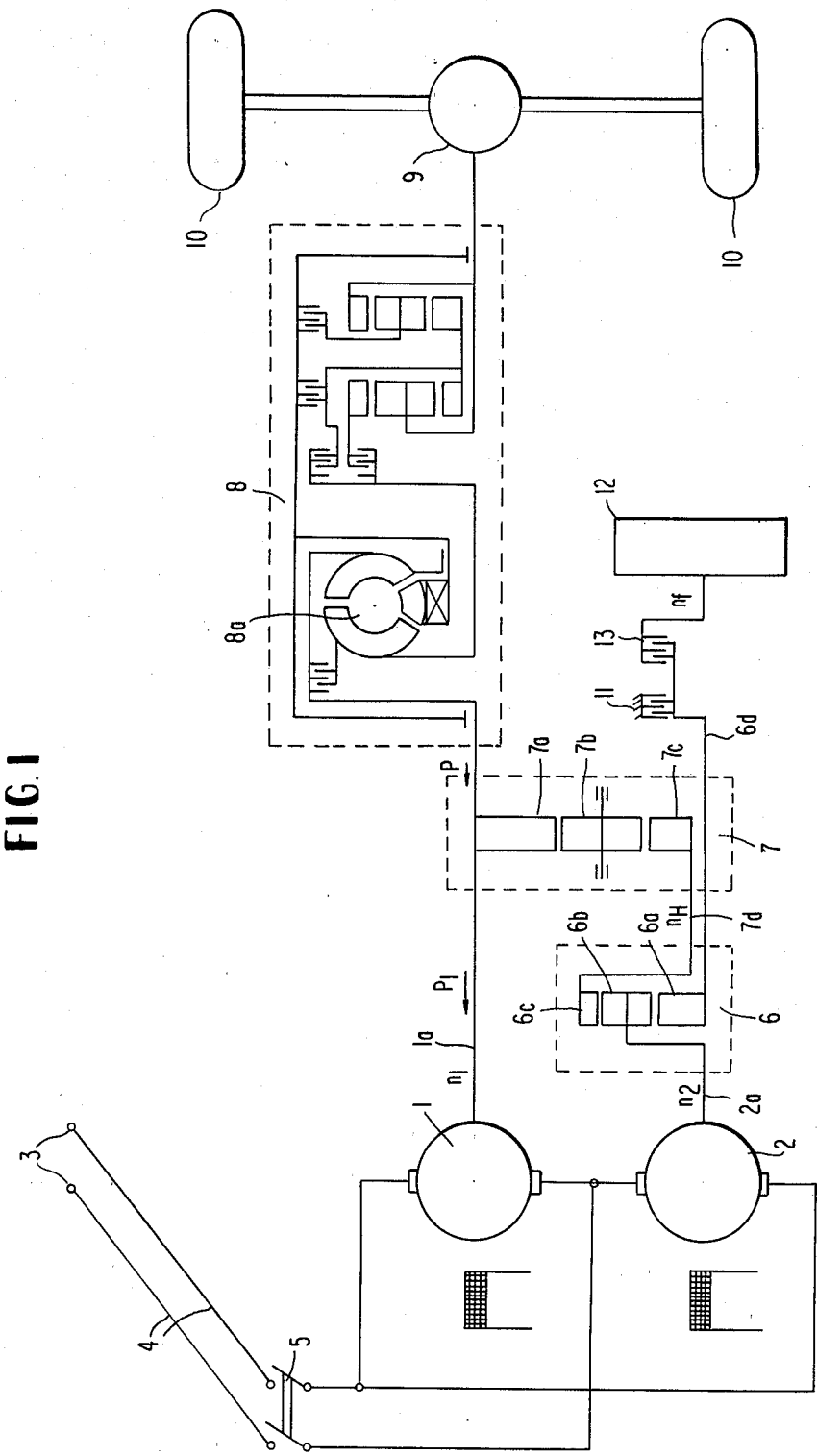

United States Patent [19]

Bader

[11] 4,388,977
[45] Jun. 21, 1983

[54] ELECTRIC DRIVE MECHANISM FOR VEHICLES

[75] Inventor: Christian Bader, Böblingen, Fed. Rep. of Germany

[73] Assignee: Daimler-Benz Aktiengesellschaft, Fed. Rep. of Germany

[21] Appl. No.: 257,427

[22] Filed: Apr. 24, 1981

[51] Int. Cl.$^3$ ............................................. B60K 9/04
[52] U.S. Cl. .................................... 180/165; 60/718; 74/572; 123/2; 180/65 E; 310/74; 318/139; 322/4
[58] Field of Search .................. 180/165, 65 A, 65 E, 180/65 R; 322/4; 318/139; 74/572; 60/716, 718; 123/2, 198 F; 310/74, 83, 114, 153

[56] References Cited

U.S. PATENT DOCUMENTS 3,477,013 11/1969 Smith ........................................ 322/4
4,010,407 3/1977 Lombard ........................ 318/139 X
4,270,622 6/1981 Travis ............................. 180/65.3 X
4,313,351 2/1982 Hagin ............................... 180/165 X
4,335,429 6/1982 Kawakatsu .................. 180/65 A X

FOREIGN PATENT DOCUMENTS 53-38010 4/1978 Japan ..................................... 180/165
53-64306 6/1978 Japan ..................................... 180/165

OTHER PUBLICATIONS

"Energy Storage Propulsion System for Rapid Transit Cars", Report No. UMTA-NY 06-0006-75-1.
*Electric Machinery*, A. E. Fitzgerald, McGraw-Hill, 1952, pp. 286–287.

*Primary Examiner*—Joseph F. Peters, Jr.
*Assistant Examiner*—Michael Mar
*Attorney, Agent, or Firm*—Craig & Burns

[57] ABSTRACT

An electric drive mechanism for vehicles, especially buses with overhead trolley routes, which routes are provided with relatively short interruptions in the overhead trolley. The drive mechanism includes a flywheel two externally excited electric motors which are adapted to be switched over from prime mover operation to generator operation, and which motors are effective as a Ward-Leonard drive during flywheel operation. The first electric motor is constructed for half of a maximum drive power and the second electric motor is likewise constructed for half or for $\sqrt{2}/2$ times the maximum drive power. Both electric motors are connected electrically in parallel during operation from the main electrical supply. The first and second motors are electrically connected in parallel during operation of the vehicle from the main electrical supply when a change-speed transmission is provided for connecting a drive shaft of one of the motors with driven vehicle wheels. A planetary gear transmission and a further transmission are provided for mechanically connecting the drive shaft of one of the motors with the second motor and with the flywheel.

25 Claims, 2 Drawing Figures

ELECTRIC DRIVE MECHANISM FOR VEHICLES

The present invention relates to a drive mechanism and, more particularly, to an electric drive mechanism for vehicles supplied from an electrical main such as, for example, buses operable over an overhead trolley route provided with relatively short interruptions, which drive mechanism includes a flywheel acting as an energy storage means and two externally excited electric motors which are adapted to be switched over from prime mover operation to generator operation so that the motors are effective as a Ward-Leonard drive during a flywheel operation.

In electric drive mechanisms for vehicles, especially for buses, the drive may be derived predominately from an electric energy supply device or electric main provided along the bus driving route, with a drive energy for traversing relatively short distances without the overhead trolley wire being supplied by an onboard energy storage means built into or inherent in the vehicle. The onboard storage means of the vehicle may, for example, be constituted by an electrochemical accumulator or battery. So-called "duo-bus" vehicles having an electric drive mechanism have been tested in practical operation and it has been determined that an entirely emission-free operation can be effected with these vehicles without having to equip the entire bus driving route with an overhead trolley wire.

The utilization of a battery as the on-board electrical storage means has a number of disadvantages, some of which have been well known while the other disadvantages did not become apparent until the course of practical testing of these vehicles. More particularly, since the energy degree of efficiency or utility, i.e., a ratio of delivered energy to stored energy is merely about 65% in a lead battery which is presently being used practically exclusively for this type of application, a markedly higher energy consumption of the vehicle results, for example, as compared with conventional overhead trolley buses. This fact also explains the relatively low regenerative braking effect whereby, even in situations of electrical vehicles solely dependent upon batteries, the range of the vehicle in city traffic could hardly be increased by more than about 15%.

Additionally, as is known, the useful energy of a battery strongly decreases with increasing load. Consequently, with a four-hour full discharge action of a traction battery, in the case of one hour full discharge operation, only about 60% of the energy of the battery is available. As a result of this fact, when dimensioning a battery for this type of application, a certain minimum size must definitely be maintained in view of the required driving power, i.e., the vehicle must constantly carry an energy storage means which is oversized or overdimensioned with respect to the energy supply just to be able to ensure the required driving power. The oversizing or overdimensioning of the energy storage means increases the installation space required for accommodating the energy storage means and, consequently, reduces the conveying capacity of the vehicle.

In order to maintain normal driving power for a vehicle which traverses merely short routes without the provision of an overhead trolley, a mechanical energy storage means such as, for example, a flywheel offers a possible solution since, on the one hand, the energy degree of efficiency is merely reduced by bearing and friction losses and, on the other hand, the useful energy is, in the flywheel proper, extensively independent of the load. Thus, it is merely necessary for the flywheel to be dimensioned for the required overhead trolley-free autonomy of the vehicle; whereas, the required drive power is determining for designing or constructing the transmission or transmitting elements. Taking into account physical circumstances, a transmission is necessary for this purpose having an infinitely variable transmission or gear ratio.

In Urban Mass Transportation Administration, Report No. UMTA-NY-06-0006-75-1, rail type vehicles are proposed wherein, in addition to driving motors, a flywheel is provided which is driven by another electric motor, with the driving motors and additional electric motor of the flywheel constituting a Ward-Leonard drive mechanism as an infinitely variable transmission, and with the drive mechanism charging the flywheel during braking and, in a reversal of the transmitting direction, utilizing the stored energy of the flywheel for starting the vehicle.

A disadvantage of the aforementioned proposed rail type vehicle resides in the fact that the driving motors as well as the electric motor for the flywheel must each be dimensioned for the full drive power. Moreover, during a charging as well as during a discharging of the flywheel storage means, the available energy is subjected twice to mechanical electrical conversion which seriously impairs the degree of efficiency. Furthermore, a power electronic circuit means is required for charging the flywheel storage means from the electrical main.

The aim underlying the present invention essentially resides in providing a drive arrangement of the aforementioned type which functions with a lower installed power, exhibits a higher degree of efficiency, dispenses with a need for additional power electronic circuit means, and is capable of delivering flywheel energy not only for starting purposes but also for enabling a traversing of relatively short routes without requiring an overhead trolley wire.

In accordance with advantageous features of the present invention, a first electric motor is constructed so as to provide half of a maximum drive power of the vehicle, with a second electric motor being constructed so as to provide half or $\sqrt{2}/2$ times the maximum drive power. Both electric motors are electrically connected in parallel during operation of the vehicle from the main supply and a drive shaft of the first electric motor acts on the driven vehicle wheels through a change-under-load transmission with a mechanically bridgeable converter. A drive shaft of the second electric motor acts on planetary gears of a planetary transmission, with a shaft of the sun gear of the planetary transmission being coupled with the flywheel through a first clutch and with a frame of the vehicle through a second clutch. The first electric motor may be mechanically connected, through a fixed transmission and through the planetary gear transmission, with the second electric motor and with the flywheel.

Advantageously, according to the present invention, the fixed transmission includes a first gear arranged on the drive shaft of the first electric motor, a second gear with a fixed axle meshing with the first gear, and a third gear meshing with the second gear. A hollow shaft, rotatably mounted on the shaft of the sun gear, is fixedly joined with the third gear of the fixed transmission and with a ring gear of the planetary transmission. While a subdivision of one traction motor into two motors of half the power does represent a certain additional expenditure, the additional expenditure is relatively insignificant when one considers the advantages which can be obtained. More particularly, by subdividing the traction motor in accordance with the present invention, it is possible, with the same motor construction, the sum total of moments of inertia of two motors of half the rated power only amounts to about 75% of the moment of inertia of a motor having a full rated power. Moreover, especially in the case of vehicles having a low road clearance, two smaller motors are, in most situations, easier to accommodate in the vehicle than one larger motor and, the conveying capacity of the vehicle is not reduced to the extent necessary to accommodate one larger motor.

Advantageously, in accordance with further features of the present invention, the first clutch coupling the sun gear of the planetary transmission with the flywheel is constructed so as to automatically disengage when a limit speed of the flywheel is exceeded.

According to the present invention, excitation windings of the two electric drive motors are, during operation of the flywheel, supplied from an on-board built-in energy supply means such as, for example, a vehicle battery or an auxiliary generator means driven by the flywheel. However, it is also possible for the excitation windings of the drive motors to be supplied, during flywheel operation, from an armature circuit of the two electric motors.

A rectifier bridge may, in accordance with the present invention, be inserted in the main supply line for the electric drive motors.

Preferably, a charging of the flywheel from a standstill up to an intermediate number of revolutions takes place, at a nominal number of revolutions and full excitation of the first electric motor, by field weakening or attenuation from the nominal number of revolutions to the maximum number of revolutions of the second electric drive motor.

It is also possible in accordance with the present invention for a charging of the flywheel from an intermediate number of revolutions up to a maximum number of revolutions to take place with the first electric drive motor being electrically arrested and with the hollow shaft being at a standstill by a field weakening or attenuation of the number of revolutions of the second electric motor, which number of revolutions has been reduced by a value of the nominal number of revolutions of the first electric drive motor. The arrested hollow shafts may be supported on the first electric drive motor, with the first electric drive motor being operated a full excitation and with a short circuited armature terminal. However, the arrested hollow shaft may be supported on a parking brake of the change-under-load transmission through the fixed transmission or supported on the fixedly braked vehicle through the fixed transmission and the change-under-load transmission.

Accordingly, it is an object of the present invention to provide an electric drive mechanism for vehicles which avoids, by simple means, shortcomings and disadvantages encountered in the prior art.

Another object of the present invention resides in providing an electric drive mechanism for vehicles such as, for example, overhead trolley buses, which enables the bus to traverse relatively short routes without requiring the overhead trolley wire.

Yet another object of the present invention resides in providing an electric drive mechanism for vehicles which is simple in construction and compact thereby minimizing the amount of installation space required in the vehicle for accommodating the drive mechanism.

A further object of the present invention resides in providing an electric drive mechanism for vehicles which has a high degree of energy efficiency.

Another object of the present invention resides in providing an electric drive mechanism for vehicles which enables an operation of the vehicle in an entirely emission free manner.

A still further object of the present invention resides in providing an electric drive mechanism for vehicles which does not require the use of oversized or overdimensioned on-board energy supply systems.

Yet another object of the present invention resides in providing an electric drive mechanism for vehicles which functions realiably under all operating conditions.

Figure 2:
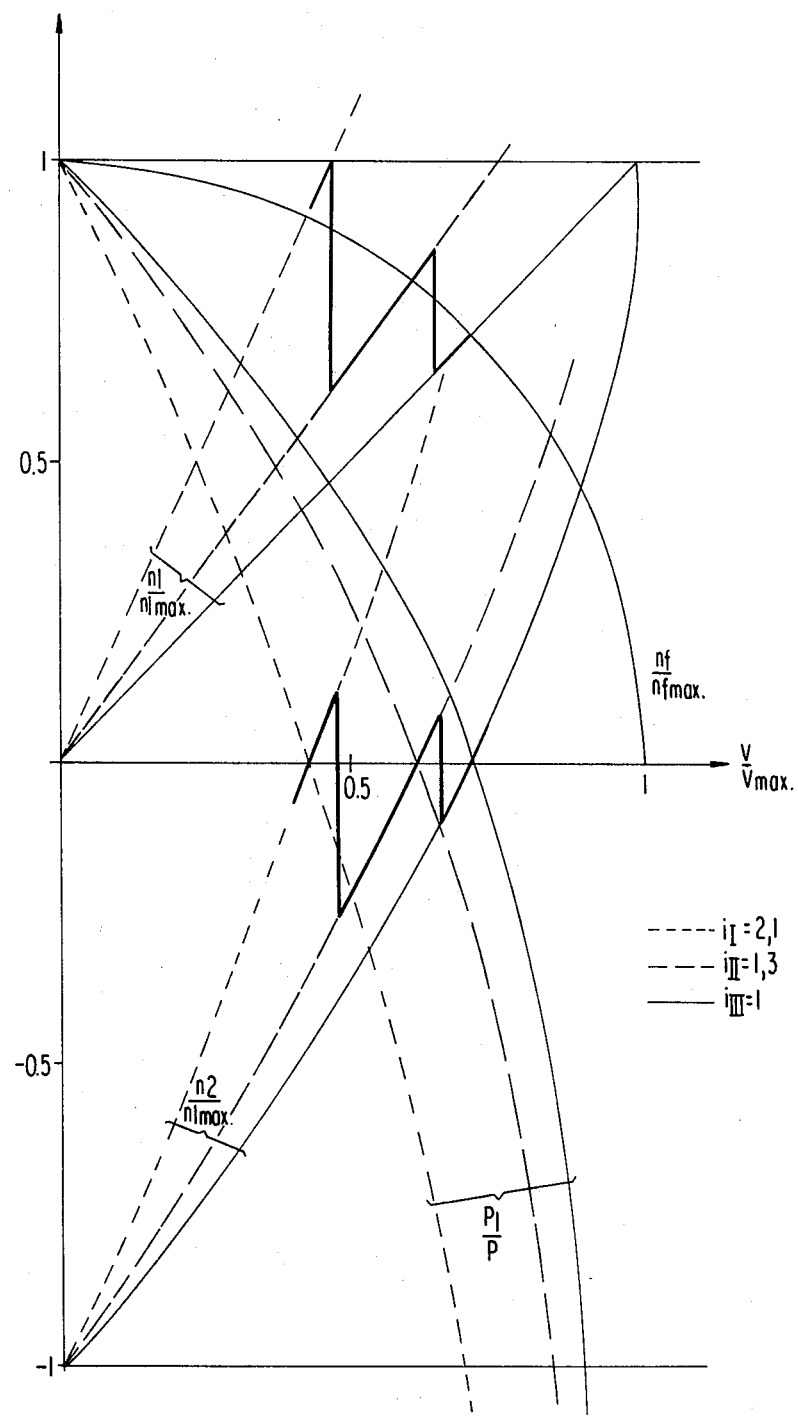

These and other objects, features, and advantages of the present invention will become more apparent from the following description when taken in connection with the accompanying drawings which show, for the purposes of illustration only, one embodiment in accordance with the present invention, and wherein:

FIG. 1 is a schematic view of a vehicle equipped with an electric drive mechanism constructed in accordance with the present invention; and FIG. 2 is a diagramatic illustration of typical numbers of revolutions in dependence upon a velocity of the vehicle equipped with the electric drive mechanism constructed in accordance with the present invention.

Referring now to the drawing and, more particularly, to FIG. 1, according to this figure, the drive mechanism includes two externally excited DC motors 1, 2 adapted to be supplied, through electrical mains such as overhead wires 3, following a vehicle driving lane, two current collectors 4, and a main switch 5, with externally fed energy. The first electric motor 1 includes a driveshaft 1a which acts, through a change-speed transmission 8, having a mechanically bridgeable torque converter 8a, on driven vehicle wheels 10 through a drive axle gear unit 9. The second electric motor 2 includes a drive shaft 2a which acts on planetary gears 6b of a planetary gear transmission 6. A shaft 6d of a sun gear 6a of the planetary gear transmission 6 may be coupled through a first clutch 13 with a flywheel 12 and through a second clutch 11 with a fixed vehicle part such as a frame member. A fixed transmission 7 includes a first gear 7a arranged on the drive shaft 1a of the first electric motor, a second gear 7b with a fixed axle meshing with the first gear 7a, and a third gear 7c meshing with the second gear 7b. A hollow shaft 7d is provided which is rotatably mounted on the shaft 6d of the sun gear 6a and is fixedly joined with the third gear 7c of the fixed transmission 7 and with a ring gear 6c of the planetary transmission 6.

The first electric motor is mechanically connected through the fixed transmission 7 and the planetary transmission 6 with the second electric motor 2 and with the flywheel 12 whereby the output power of the motor 2 is added to the output power of the motor 1. The reactive moment at the sun gear 6a of the planetary gear transmission is either absorbed through the second clutch 11 or transmitted through the first clutch 13 to the flywheel 12.

While the vehicle is under an exclusive flywheel operation without being supplied energy from the overhead wires 3, the clutch 11 is disengaged and the clutch 13 is engaged, with the switching condition of the two clutches 11, 13 being reversed if, with an operation of the vehicle through the main electrical supply, no energy exchange is to take place through the flywheel 12. This condition would prevail if, for example, the vehicle is to be accelerated without the aid of energy from the flywheel 12 so that this energy is preserved for a subsequent route section to be travelled without the provision of the overhead wires 3. Furthermore, the first clutch 13 executes a safety function since, once the flywheel 12 has reached a maximum permissible speed limit, a further dangerous increase in the number of revolutions of the flywheel 12 can be realiably prevented by an automatic disengagement of the clutch 13.

The motors 1 and 2 are first brought up to a nominal speed under full excitation of the winding upon a closing of the main switch 5 through a starter circuit (not shown), of conventional construction, which starter circuit may, for example, include a series of resistors adapted to be bridged by switches. The change of the speed of the motors 1, 2 takes place in a conventional manner exclusively by varying the shunt excitation. The controllable speed range of the motors 1, 2 is selected in accordance with a required maximum vehicle speed and a staggering or shifting of individual gears in the change-speed transmission 8. The drive mechanism of the present invention makes it possible, in a conventional manner, to dispense with any power electronic circuit in the armature circuit of the motors 1, 2 so that it is possible to use standardized mass produced components thereby yielding an economical solution for the drive mechanism.

The mode of operation of the electric drive mechanism of the present invention including the flywheel drive unit will be explained more fully in connection with FIG. 2 and the equations set forth hereinbelow. For the purposes of simplifying the following analysis, factors such as, for example, aerodynamic resistance and rolling friction resistance will be neglected with respect to the driving resistances encountered by the vehicle and only a drive power necessary for acceleration of the vehicle will be taken into account. The neglecting of the above-noted factors is more justified since the vehicle having arranged therein the drive mechanism of the present invention will preferably be used in inner city traffic with a greatly unsteady or changeable driving mode.

An energy content of the flywheel 12 at maximum speed $n_{Fmax}$ is to correspond exactly to a kinetic energy of the vehicle at a maximum velocity $v_{max}$, in accordance with the following relationship:

$$F(2\pi n_{Fmax})^2 = mv^2_{max},$$

wherein:
F = a moment of inertia of the flywheel, and
m = the vehicle mass.

If a change in the vehicle velocity is executed exclusively by energy exchange with the flywheel 12, the following results, due to the law of energy conservation:

$$F[(2\pi n_{Fmax})^2 - (2\pi n_F)^2] = mv^2$$

Together with the above formula, this relationship can be converted to:

$$1 - (n_F/n_{Fmax})^2 = (v/v_{max})^2$$

In other words, utilizing the aforementioned simplifications, a circular relationship results for a dependency of the speed of the flywheel 12 on the driving speed of the vehicle, both factors being based on their maximum values.

The following relationship applies for the number of revolution of the planetary transmission 6 in flywheel operation of the vehicle:

$$n_F + i_o n_H = (1 + i_o)n_2,$$

wherein:
$i_o > 0 =$ a fixed transmission ratio of the planetary transmission 6; and
$n_H =$ the number of revolutions of the hollow shaft 7d, simultaneously representing the input speed of the fixed transmission 7.

The gear ratio of the fixed transmission 7 to the shaft 1a of the motor 1 with a speed $n_1$ is to be selected exactly in such a way that the following relationship applies:

$$n_H = n_1(1 + i_o)/i_o.$$

Thus, the following holds true for a speed relationship at the planetary transmission 6:

$$n_F = (1 + i_o)(n_2 - n_1).$$

The following table indicates the values for the various speeds in the two extreme cases:

|  | Vehicle at Standstill | Flywheel at Standstill |
| --- | --- | --- |
| Flywheel speed $n_J$ | $n_{Jmax}$ | 0 |
| Speed $n_1$ of motor 1 | 0 | $n_{1max}$ |
| Speed $n_2$ of motor 2 | $n_{2o} = n_{Jmax}/(1 + i_o)$ | $n_{1max}$ |

The driving speed of the vehicle results in the usual way from the input speed of transmission 8, in accordance with the following relationship:

$$v = 2\pi r n_1/i_g,$$

wherein:
r = the radius with an inclusion of the transmission ratio of the axle gear 9; and
$i_g =$ a transmission ratio of the individual gear stages of transmission 8.

The maximum driving speed of the vehicle is obtained in direct gear ($i_g = 1$): $v_{max} = 2\pi r n_{1max}$, so that the driving speed can be expressed by the following related variables:

$$v/v_{max} = n_1/(i_g n_{1max}).$$

Stipulating that the amount of the speed of motor 2 with the flywheel 12 at a standstill as well as with the flywheel 12 being fully charged, with a speed of $n_{Fmax}$, is to be the same value, $/n_{2o}/ = /n_{1max}/$, then the speed equation of the planetary transmission 6, in related variables, reads as follows:

$$n_2/n_{1max} = n_1/n_{1max} - n_F/n_{Fmax}.$$

Together with the equation resulting from the law of energy conservation, the following evolves as the final relationship for the speed of motor 2 in dependence on the driving speed during flywheel drive operation of the vehicle:

$$n_2/n_{1max} = i_g v/v_{max} - (1-(v/v_{max})^2)^{0.5}.$$

FIG. 2 provides an example of a series of curves for a related speed $n_2$ for three gear stages $i_I=2,1:1$, $i_{II}=1,3:1$, and $i_{III}=1:1$. The illustrated relationship of the number of revolutions for the vehicle speed is identical with the timed progression of the number of revolutions upon acceleration $v/v_{max}=0\to1$ and deceleration $v/v_{max}=1\to0$, if the excitation of the windings of the motors 1 and 2 are controlled in such a way that a constant vehicle acceleration is obtained. By a corresponding control of the excitation windings of the motors 1 and 2, it is possible to attain $n_{20}=n_{1max}$, i.e. a speed of motor 2 which is identical with respect to an amount and direction of rotation of the vehicle at a standstill as well as with the flywheel 12 at a standstill. However, in an intermediate speed range, a speed increase is obtained with a maximum value of $\sqrt{2} \cdot n_{1max}$.

This may necessitate, in individual cases, an overdimensioning or oversizing of the motor 2 but, as illustrated in FIG. 2, there is no change in a direction of rotation of $n_2$. Consequently, at least for the motor 2, in the situation $n_{20}=n_{1max}$, the electrical connection to an external energy supply can be retained even during operation of the flywheel 12, wherein a direction and size of energy exchange with the main supply may, as an additional feature, be adjusted by a suitable choice of the excitation of the windings of the motors 1 and 2.

A connection to the external main supply must be interrupted if $n_{20}=-n_{1max}$ during operation of the flywheel 12, due to the fact that the number of revolutions $n_2$ passes through zero, at least in a vehicle speed range around a zero traversal, the magnitude of this range depending on a degree of permissible field attenuation. However, with $n_{20}=-n_{1max}$, significantly more favorable conditions arise with respect to a circulating power than in comparison with the situation of $n_{20}=n_{1max}$. For this reason, the situation of $n_{20}=-n_{1max}$ forms the basis for the following description.

As indicated by the vertical connections or lines between the curves associated with the individual gear stages $i_I$, $i_{II}$, $i_{III}$, for the speed curves $n_1$ and $n_2$, a possibility presents itself at low driving speeds to raise a number of revolutions $n_1$ by selecting a higher gear ratio and simultaneously reducing a value of $n_2$ so that a smaller and thus more favorable transmission ratio $n_2/n_1$ is obtained since, as is known, the respectively associated excitation fluxes of the motors 1 and 2 are to be set in a reciprocal relationship thereto. A supply (not shown) for causing an excitation of both windings is effected by suitable adjusting members such as, for example, transistor-choppers which, during electrical main operation, are likewise supplied from the external main. In a pure flywheel operation, with the drive mechanism of the present invention, three types of supply can be provided which may be utilized individually or in combination with one another; namely, a supply from a vehicle battery, a supply by means of an auxiliary generator coupled with the flywheel 12, and a supply from an armature circuit of the two motors 1 and 2.

A series of functions attainable with the drive mechanism of the present invention are as follows:

A pure electrical main operation independently of the charging condition of the flywheel and characterized by a predetermined number of revolutions, is possible with the clutch 13 disengaged and the sun gear of the planetary gear transmission 6 being retained by the clutch 11. If the vehicle is to be decelerated at a velocity v, the speed $n_F$ of the flywheel 12 must necessarily be less than or equal to a value in FIG. 2 for a corresponding value of v in order to prevent an exceeding of a maximally permissible flywheel speed $n_{Fmax}$. Thus, if braking is to be executed with the flywheel 12 being at a standstill or revolving slowly, for example, beginning at a correspondingly high speed, then the clutch 11 is disengaged and the clutch 13 is engaged.

At the same time, an excitation of the windings of the motor 1 must be reduced and/or an excitation of the windings of the motor 2 must be increased in such a way that a reduced motor speed $n_2$ results in accordance with a relationship determined by the planetary gear transmission and the fixed transmission, namely, $n_2=n_1+n_F/(1+i_o)$. A connection to the external main through the main switch must be disconnected at the latest when no sufficient counter or inverse voltage with respect to the supply voltage can any longer be adjusted with the excitation of the two windings of the motors 1 and 2, considering a correlation between the two speeds $n_1$ and $n_2$ as determined by the planetary transmission 6, due to magnetic saturation.

In the above-noted situation, the power flow which will prevail is as follows:

A braking power P delivered by the vehicle is increased at high vehicle velocity by an internal circulating power $(-P_1)>0$ from motor 1 having a value $P_1=P/(1-n_1/n_2)$. A sum total of both powers $P/(1-n_2/n_1)$ is fed to the ring gear 6c through the fixed transmission 7. The planetary gear transmission 6 divides this power precisely in such a manner that a braking power P is fed to the flywheel 12 and a mechanical power $(-P_1)$ in the motor 2, operating in a generator mode, is converted into an electrical power and fed to the motor 1. Accordingly, while at high driving speeds, the power must be transmitted mechanically through the transmission 7 in all cases which is higher than an actual useful output P, a reversal of the internal power flow takes place at lower driving speed in such a manner that the electrical transmission branch, i.e., the motors 1 and 2, as well as the mechanical transmission branch, i.e., the fixed transmission 7, are loaded in each case with only a part of the useful output P to be transmitted. This is advantageous for two reasons. First, a degree of efficiency of the mechanical transmission branch is, in most cases, greater than that of the electrical branch and, for this reason, from the viewpoint of satisfactory total degree of efficiency, an arrangement is advantageous wherein a power transmitted in the electrical branch is maximally low. Secondly, due to a series connection of the two electrical motors 1 and 2, in the flywheel operation, the electrical transmittable power is only half as large as in the main operation wherein the two motors 1, 2 are connected in parallel. However, FIG. 2 shows for the curve of power $P_1$ that, with a selected arrangement, a power loss occurs only for a velocity range $0<v/v_{max}<0.23$ and $0.83<v/v_{max}<1$, so that, in practical operation, there is no noticeable limitation.

Finally, during a standstill of the vehicle, the flywheel 12 reaches its maximum number of revolutions $n_{Fmax}$. With the hollow shaft 7d being braked or arrested, the motor 2 has just assumed a number of revolutions $n_{20}=n_{Fmax}/(1+i_o)$. During this time, the motor is unexcited so that no power is transmitted to the brake or arrested motor 1. To reduce friction losses, it is advantageous during a long term standstill of the vehicle at, for example, stopping points of the vehicle, to disengage the clutch 13. During starting in flywheel operation, the processes take place in a reversed sequence as compared to the aforementioned braking operation.

As soon as the vehicle has been accelerated to a desired speed, an energy supply from the main can be obtained by disengaging the clutch 13 and engaging the clutch 11 so that thereby the two speeds $n_1$ and $n_2$ are perforce adapted to each other. In this connection, the mechanical synchronizing work for accelerating the rotor flywheel mass of the motor 2, normally showing up as heat in the clutch 11, may be reduced by electrically supported synchronization by means of an excitation of the windings of the motor 2. Subsequently, by changing an excitation of the windings of both motors 1 and 2 in the same sense, a counter voltage is produced in the armature circuit of both motors of such a size that an almost currentless and jerk-free closing of the main switch 5 is possible.

The desired driving power during the main operation is then obtained in the usual manner by a corresponding adjustment of the excitation currents for the windings of the two motors. An electrical synchronization, i.e., an adaption of the armature voltage to the main voltage prior to a closing of the main switch is simplified in those situations wherein no regenerative braking from the vehicle is provided to the feed supply network such as, for example, while driving down a relatively long downhill grade if the supply network, for example, has two few simultaneously turned on loads. In these instances, a diode or single-phase bridge rectifier circuit may be conventionally inserted in the current supply from the main. Both types of circuit connections prevent reversal of energy flow to the supply main so that for the currentless closing of the switch 5, it must merely be ensured that the armature voltage of the motors 1 and 2 is higher than an approximately maximally occuring main voltage. Moreover, the use of a bridge circuit offers the advantage that the supply is independent of the polarity of the main voltage, i.e., that even in the case of interchanged main feed lines, a proper operation is possible without additional switching operations.

Before the vehicle traverses relatively short distances without an external electrical supply by the electrical main, it may be necessary to fully charge the flywheel 12, for example, at a stopping point such as, for example, a bus stop. A correspondingly reversed speed relationship of the planetary gear transmission 6, $n_F=(1+i_0)(n_2-n_1)$ indicates that it is possible by a field weakening or attenuation of the motor 2, while the motor 1 assumes a nominal number of revolutions upon full excitation, to charge the flywheel 12 even from a standstill from the external main. To attain a maximum number of revolutions of the flywheel 12, the clutch 13 must be briefly disengaged at an intermediate number of revolutions of the flywheel 12, with the value of the number of revolutions depending upon a permissible field weakening range of the motor 2, and the motor 1 must be electrically braked or arrested. At the same time, the number of revolutions of the presently unstressed motor 2 is reduced by a value of the nominal speed of the motor 1 by increasing the excitation. Thereafter, the clutch 13 is engaged again and the flywheel 12 is brought to its permissible maximum number of revolutions $n_{Fmax}$ by the motor 2. A reactive moment at an arrested or braked ring gear 6c of the planetary transmission 6 can be applied depending upon the magnitude by a fully excited motor 1, the armature terminals of which are then short circuited, or the reactive moment may be absorbed through the transmission 8 at a parking brake or fixedly braked vehicle.

While I have shown and described only one embodiment in accordance with the present invention, it is understood that the same is not limited thereto but is susceptible of numerous changes and modifications as known to one having ordinary skill in the art and I therefore do not wish to be limited to the details shown and described herein, but intend to cover all such modifications as are encompassed by the scope of the appended claims.

I claim:

1. An electrical drive mechanism for a vehicle comprising, a drive mechanism adapted to be fed with electrical energy from an electrical main supply means and including an energy storage means in the form of a flywheel, at least two electrical motors adapted to be switched from a prime mover mode of operation to a generator mode of operation and being effective as a Ward-Leonard drive during a flywheel operation, a first of said drive motors being adapted to provide about one half of a maximum drive power for the vehicle, a second of said drive motors being adapted to provide about one half of the maximum drive power for the vehicle, means for electrically connecting said first and second motors in parallel during operation of the vehicle from the electrical main supply means, first transmission means for connecting the drive shaft of said first motor with driven wheels of the vehicle, second transmission means having an input connected to the drive shaft of said second motor and an output connected to said flywheel, third transmission means interconnected between the output of said second transmission means and the drive shaft of said first motor, and selectively actuatable clutch means interposed between the output of said second transmission means and said flywheel.

2. An electrical drive mechanism according to claim 1, characterized in that the second transmission means includes a planetary gear means connected to the drive shaft of the second transmission, a sun gear means cooperable with the planetary gear means, and a ring gear means, the output means of the second transmission means includes a shaft connected to the sun gear means, the third transmission means includes a first gear means arranged on the drive shaft of the first motor, a second gear means meshing with the first gear means, a third gear means meshing with the second gear means, and a hollow shaft means rotatably mounted on the shaft connected to the sun gear means, and in that the hollow shaft is fixedly connected with the third gear means and the ring gear means of the second transmission means.

3. An electrical drive mechanism, according to claim 2, characterized in that the clutch means includes a first clutch for coupling the output means of the second transmission means with the flywheel and a second clutch for coupling the output means with a fixed vehicle part.

4. An electrical drive mechanism, according to claim 3, characterized in that the first transmission means is an automatic change-speed transmission and includes a mechanically bridgeable hydrodynamic torque converter means arranged at an input side of the transmission.

5. An electrical drive mechanism according to claim 4, characterized in that the first clutch is adapted to be automatically disengaged when a limiting rotational speed of the flywheel is exceeded.

6. An electrical drive mechanism according to claim 5, characterized in that each of the two motors include windings, and in that means are provided connecting the windings of the two motors with a battery means of the vehicle so as to enable a supplying of electrical energy to the windings during the flywheel operation.

7. An electrical drive mechanism according to claim 5, characterized in that each of the two motors include windings, and in that means are provided for connecting the windings of the two motors with an auxiliary generator means driven by the flywheel during the flywheel operation.

8. An electrical drive mechanism according to claim 5, characterized in that each of the two motors include windings and an armature circuit means for supplying energy to the windings during the flywheel operation.

9. An electrical drive mechanism according to one of claims 5, 6, 7, or 8, characterized in that the electrical main supply means includes a rectifier bridge circuit means inserted in a supply line for the motors.

10. An electrical drive mechanism according to claim 9, characterized in that means are provided for controlling a field of the second motor from a nominal rotational speed to a maximum rotational speed so as to enable a boosting of a rotational speed of the flywheel from a standstill to an intermediate rotational speed with the first motor at a nominal rotational speed and at full excitation of the windings.

11. An electrical drive mechanism according to claim 10, characterized in that means are provided for selectively braking the hollow shaft means, means are provided for selectively electrically arresting the first electric motor, and in that the means for controlling the field of the second motor are adapted to reduce the rotational speed of the second motor by a value of the nominal rotational speed of the first motor thereby enabling a boosting of the flywheel from the intermediate rotational speed to a maximum rotational speed to take place with the hollow shaft means at a standstill and the first motor electrically arrested.

12. An electrical drive mechanism according to claim 11, characterized in that a reactive moment of the braked hollow shaft means is supported on the first motor, and in that the first motor is operated at a full excitation and with short-circuited armature terminals.

13. An electrical drive mechanism according to claim 11, characterized in that a reactive moment of the braked hollow shaft means is supported on a parking brake of the change-speed transmission means through the third transmission means.

14. An electrical drive mechanism according to claim 11, characterized in that a reactive moment of the braked hollow shaft means is supported on a parking brake of the first transmission means through the third transmission means.

15. An electrical drive mechanism according to claim 11, characterized in that a reactive moment of the braked hollow shaft means is supported at a fixedly braked vehicle through the third transmission means and the first transmission means.

16. An electrical drive mechanism according to one of claims 1, 3, or 4, characterized in that each of the two motors include windings, and in that means are provided connecting the windings of the two motors with a battery means of the vehicle so as to enable a supplying of electrical energy to the windings during the flywheel operation.

17. An electrical drive mechanism according to one of claims 1, 3, or 4, characterized in that each of the two motors include windings, and in that means are provided for connecting the windings of the two motors with an auxiliary generator means driven by the flywheel during the flywheel operation.

18. An electrical drive mechanism according to one of claims 1, 3, or 4, characterized in that each of the two motors include windings and an armature circuit means for supplying energy to the windings during the flywheel operation.

19. An electrical drive mechanism according to claim 2, characterized in that means are provided for controlling a field of the second motor from a nominal rotational speed to a maximum rotational speed so as to enable a boosting of a rotational speed of the flywheel from a standstill to an intermediate rotational speed with the first motor at a nominal rotational speed and at full excitation of the windings.

20. An electrical drive mechanism according to claim 19, characterized in that means are provided for selectively braking the hollow shaft means, means are provided for selectively electrically arresting the first electric motor, and in that the means for controlling the field of the second motor are adapted to reduce the rotational speed of the second motor by a value of the nominal rotational speed of the first motor thereby enabling a boosting of the flywheel from the intermediate rotational speed to a maximum rotational speed to take place with the hollow shaft means at a standstill and the first motor electrically arrested.

21. An electrical drive mechanism according to claim 19, characterized in that a reactive moment of the braked hollow shaft means is supported on the first motor, and in that the first motor is operated at a full excitation and with short-circuited armature terminals.

22. An electrical drive mechanism according to claim 19, characterized in that a reactive moment of the braked hollow shaft means is supported on a parking brake of the change-speed transmission means through the third transmission means.

23. An electrical drive mechanism according to claim 19, characterized in that a reactive moment of the braked hollow shaft means is supported on a parking brake of the first transmission means through the third transmission means.

24. An electrical drive mechanism according to one of claims 1, 3, or 4, characterized in that the electrical main supply means includes a rectifier bridge circuit means inserted in a supply line for the motors.

25. An electrical drive mechanism according to claim 1 characterized in that the second of said drive motors is constructed to provide about $\sqrt{2}/2$ of the maximum drive power for the vehicle.

* * * * *

UNITED STATES PATENT AND TRADEMARK OFFICE
CERTIFICATE OF CORRECTION

PATENT NO. : 4,388,977
DATED : June 21, 1983
INVENTOR(S) : Christian Bader

It is certified that error appears in the above—identified patent and that said Letters Patent is hereby corrected as shown below:

On the title page add:

--[30]   Foreign Application Priority Data

April 24, 1980   Fed. Rep. of Germany ..... 3015754--.

Signed and Sealed this

Eighteenth Day of October 1983

[SEAL]

Attest:

GERALD J. MOSSINGHOFF

Attesting Officer    Commissioner of Patents and Trademarks